UNITED STATES PATENT OFFICE.

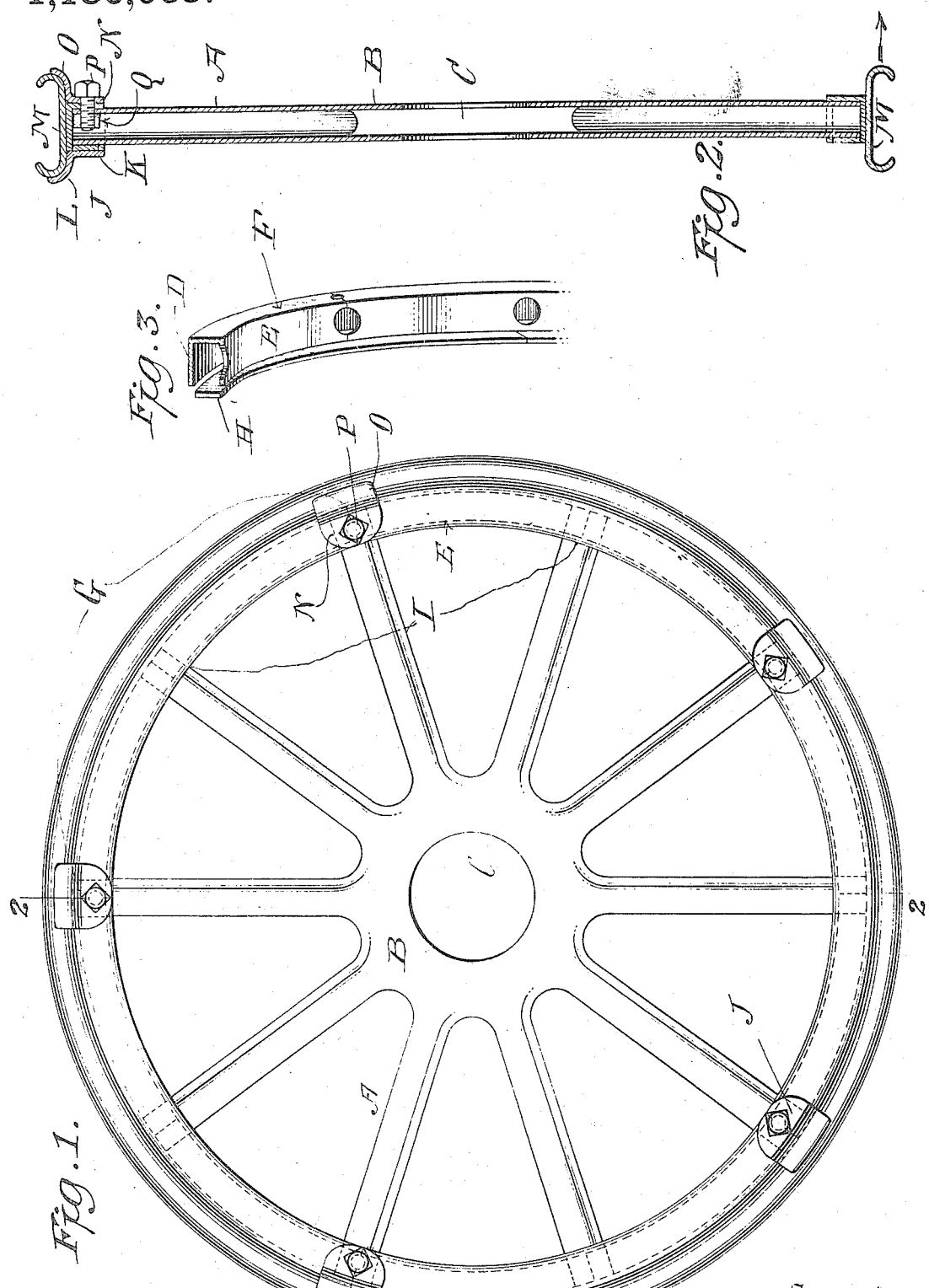

THOMAS E. MURRAY, OF NEW YORK, N. Y.

VEHICLE-WHEEL.

1,180,065.

Specification of Letters Patent.

Patented Apr. 18, 1916.

Application filed August 19, 1915. Serial No. 46,338.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels formed wholly of sheet metal, and consists in the construction of said wheel and of the means for rendering the rim demountable, hereinafter more particularly set forth.

In the accompanying drawings—Figure 1 is a face view of my wheel. Fig. 2 is a section on the line 2, 2 of Fig. 1. Fig. 3 shows in perspective a portion of the hollow fixed rim with its covering plate detached.

Similar letters of reference indicate like parts.

The spokes A are tubular and preferably formed integral with the web B at their inner ends, in which web there is a central opening C for the reception of the hub. The hollow fixed rim has its outer circumferential wall D and its inner circumferential wall E made integral with one side wall F, and is also made in sections, as G. In the wheel shown in the drawing, five such sections are present, secured end to end to complete the circle. The other side wall or cover plate of the fixed rim is a flat ring H, made also in sections I of the same length as the sections G, but disposed so as to break joints when said ring is in place and secured by welding to the walls E, F.

In the inner wall E are openings to receive the ends of the spokes which abut against the outer wall D and are secured by welding.

I provide pairs of clamping devices, generally indicated at J. I may apply one pair of said clamping devices to each spoke or to alternate spokes, as shown in Fig. 1. The fixed member K of each clamp, which may be united by welding to fixed rim wall H, has a curved extension L which bears against the rim M, which rim surrounds the fixed rim and is adapted to receive a tire shoe. The movable member N of each clamp has a similar extension O which bears against the opposite side of rim M. Said member is secured in place by a screw bolt P which passes through the spoke wall and engages a metal block Q which is welded to said wall near the outer end thereof. By removing the bolt P, the member N may be taken off. When all the members N of the several clamps are detached, the rim M may be slid in the direction of the arrow, Fig. 2, from the fixed rim, and thus demounted.

I claim:

A vehicle wheel of metal, comprising a hollow fixed rim having an upwardly turned flange on one side, tubular spokes seated at their outer ends in said hollow rim, a metal block welded to each spoke near the outer end thereof and having a threaded opening, a movable outer rim, a plurality of clamping members for said outer rim, and threaded bolts for securing said members to one side of said fixed rim; the said bolts passing through said clamping members, a wall of said fixed rim, a wall of each spoke and engaging in said threaded openings in said blocks.

In testimony whereof I have affixed my signature in presence of two witnesses.

THOMAS E. MURRAY.

Witnesses:
GERTRUDE T. PORTER,
MAY T. MCGARRY.